United States Patent Office 2,967,377
Patented Jan. 10, 1961

2,967,377
COMPOSITION AND PROCESS FOR TREATMENT OF DUTCH ELM DISEASE
Glenn A. Brown, Rte. 4, Huntington, Ind.
No Drawing. Filed Feb. 23, 1960, Ser. No. 10,036
7 Claims. (Cl. 47—57.5)

This invention relates to a novel method of treating and preventing Dutch Elm Disease and to novel compos.tions useful in the treatment thereof.

This application is a continuation-in-part of my application Serial No. 687,871 filed October 3, 1957, now abandoned.

A serious fungus disease of elms was discovered in Holland in 1919. This disease became known as Dutch Elm Disease and was imported into the United States first in Ohio in 1930, then into New York in 1930 and into Indianapolis during World War II. The disease has been responsible for the virtual elimination of the elm as a shade tree in the areas most seriously affected. To date, no complete cure for this disease has been found. The fungus causing the Dtuch Elm Disease grows in the xylem tubes of the infected trees, causing them to become obstructed. Eventually, the obstruction of the tubes becomes complete and the affected part becomes necrotic.

It is an object of this invention to provide compositions which not only attack the disease-causing fungus, but which also aid the tree in combatting and overcoming the fungal infection and the pathological changes induced thereby.

It is a further object of this invention to assist the immunological processes of an infected tree in overcoming the deleterious circulatory effects of the disease by dissolving the occlusions in the xylem tubes and by encouraging new growth.

In fulfillment of the above and other objects, this invention provides the following novel process of treating Dutch Elm Disease:

A downward slanting hole is bored into the trunk of an infected elm tree from one to three feet above the ground. In this hole is placed an aqueous suspension containing the following active ingredients—elemental sulfur, tartaric acid, iodine and water. Then a plug or other closure is placed tightly in the mouth of the hole.

This process insures that the acidic fungicidal solution will be introduced into the xylem tubes where the fungus disease is active and where the tree fluids show an alkaline reaction. After the first suspension has been absorbed, the plug can be removed from the hole and a second suspension introduced therein. This second suspension contains as active ingredients elemental sulfur, tartaric acid, a source of magnesium ions such as magnesium sulfate and a water-soluble boron compound. Tartaric acid can be used as the free acid or in the form of a salt such as cream of tartar (potassium acid tartrate). In a preferred embodiment of this invention the second suspension contains in addition to the stated ingredients a completely water-soluble high strength fertilizer such as a 23—21—17 or 20—20—20 fertilizer, either of which has urea as the chief source of nitrogen. Metal ions other than magnesium ions; e.g. iron ions, can also be administered as a preventive measure to trees not yet infected with Dutch Elm Disease.

The hole provided for the treatment solution is preferably bored into the trunk of the diseased tree about twenty inches above the ground, although the hole can be bored anywhere from one to three feet above ground. It is necessary, however, that the hole not be bored into a buttress root. For example, in an 8" diameter tree, a hole about ⅜" in diameter and 4" deep is bored downwards into the trunk at an angle of about 25 degrees. These dimensions are not critical and will vary with particular trees. In larger trees having a diameter of two to three feet or larger, treatment holes are bored about every 12" around the trunk of the tree. If the disease seems to have progressed to a considerable extent, these treatment holes can be placed every 10" around the trunk. An easy method of providing a place for the tight fitting covering plug for the treatment hole involves boring a slightly larger hole for a short distance parallel to the ground as desired, and then inserting a prefitted plug into this enlarged portion of the solution-containing hole. This plug not only serves to keep the injected solution in the hole and to keep oxygen out, but also prevents excessive bleeding of the tree.

The injection of suspension #1 which contains elemental sulfur, iodine and tartaric acid, using a hole or holes as described above to provide a space for the injected suspension, will generally restore vigorous life to a tree previously showing typical signs of Dutch Elm Disease, such as the yellowing of the leaves on a branch or branches within a period usually about four weeks to three months after the initiation of the treatment. In actual practice the forward progress of the disease is arrested after a period of from two weeks to a month following the first injection. Then, about a month or two later, the tree is free of all evidence of Dutch Elm Disease except for the presence of necrotic limbs in which the disease had progressed too far for reversal. Interestingly, if treatment holes are drilled in only one side of a large tree, and the usual treatments administred using these holes, only the treated side of the tree recovers from the disease. This effect is made possible by the fact that the xylem tubes are chiefly vertical and have little horizontal cross circulation. While it is not possible to state with finality that the reversal of the disease seen upon injection of suspension #1 preferably followed by injection of suspension #2 is permanent, there is no question but that the novel process herein described will prolong the life of an infected tree beyond its median eighteen month, and its maximum three year life expectancy. In the same way, while it cannot be said with certainty that injection of suspension #2 into an elm tree will forever prevent the onset of Dutch Elm Disease, only a small percentage of trees so treated have succumbed to the disease in an eighteen month period since treatment in an area where over 50% of untreated trees have been attacked in the same length of time. However, once necrosis has set in in a limb of an elm tree infected with Dutch Elm Disease, my novel process will not reverse that necrosis and that part of the tree is dead.

The use of a complete high formula water-soluble fertilizer in suspension #2 is not solely for the purpose of fertilizing the tree since this type of fertilizer is generally administered through roots or leaves. However, despite the fact that it is not customary to administer a fertilizer by injection, as is done in this aspect of my novel process, this mode of administration is far more beneficial than administering the same amount of fertilizer by conventional means and it appears to affect directly and favorably the functioning of the diseased xylem tubes.

This invention is further illustrated by the following specific examples:

EXAMPLE 1

*Treatment of infected tree*

A hole 5/8" in diameter and 1/4" deep was bored into an elm tree about 8" in diameter and infected with Dutch Elm Disease. A second hole 4" deep and 3/8" in diameter was bored through the center of the first hole at a downward angle of about 25°. Into this longer hole was placed about 5 cc. of an aqueous suspension having the following composition:

*Suspension #1.*—16 g. sulfur, 2.5 g. tartaric acid, 0.4 cc. of a 17% tincture of iodine and 32 oz. water (pH of the suspension is in the range of 2.8 to 3). A disc 5/8" by 1/4" was placed tightly in the hole as a plug. About two weeks later during which time the above suspension has been absorbed, the plug was removed and about 5 cc. of a second suspension was placed in the hole. This second suspension had the following composition:

*Suspension #2.*—24 g. sulfur, 1 g. tartaric acid, 1.5 g. magnesium sulfate, 0.5 g. boric acid, 11 g. 23—21—17 water-soluble fertilizer containing 12% nitrogen as urea and 21% phosphorous as phosphoric acid and 32 oz. water (final pH of this suspension in the range of 4.5–5). Two weeks after the injection of the second suspension, the tree had begun to recover. Two weeks later no sign of Dutch Elm Disease was present in the tree. The yellow leaves were gone and new growth was visible everywhere. One and one-half years later, the tree was still free from observable signs of Dutch Elm Disease.

Alternate suspension #2 containing 24 g. of sulfur, 24 g. of cream of tartar, 1.5 g. of magnesium sulfate and 0.5 g. of boric acid plus a water-soluble fertilizer has been employed in place of suspension #2 in the above process. Injection of alternate suspension #2 into trees exhibiting symptoms of Dutch Elm Disease following the injection of suspension #1 into the same tree as specified above gave similar results to those obtained previously with suspension #2. In some cases, use of suspension #1 with alternate suspension #2 appeared to give superior results.

EXAMPLE 2

*Immunization of uninfected tree*

About 16 elm trees free from ostensible Dutch Elm Disease were injected with suspension #2 as given in Example 1 using a hole bored as in Example 1. One and one-half years later, none of the trees had shown any Dutch Elm Disease. In the surrounding territory, about 50% of the elm trees became victims of Dutch Elm Disease in the same period, with 66% dying.

Alternate suspension #2 containing cream of tartar has been substituted for suspension #2 in the above example. Similar protection of elm trees threatened with Dutch Elm Disease was obtained.

EXAMPLE 3

*Partial treatment in infected tree*

A tree about 36" in diameter was found which showed signs of Dutch Elm Disease in one of two main branches. Five holes were drilled, as in Example 1, in the half of the trunk beneath the side which was not infected. The same treatment method employing the suspensions #1 and #2 about two weeks apart was utilized, as in Example 1. In this instance, the half of the tree above the treated side was free from infection six months later but in the other untreated side, the disease progressed as usual.

EXAMPLE 4

*Treatment of large tree*

An elm tree having no sign of Dutch Elm Disease and about 40" in diameter was treated by the method of Example 2 except that twelve holes were bored about 12" apart in the trunk in a ring, and suspension #2 was placed in all twelve holes. Otherwise, the treatment method and results were the same, the tree being free from disease one and one-half years later. In the same way, a large elm about 40" in diameter but having Dutch Elm Disease was treated by the method of Example 1 except that twelve holes about 12" apart were drilled to hold the injection suspensions. This large elm so treated was also free of Dutch Elm Disease one and one-half years later.

EXAMPLE 5

*Treatment of large numbers of trees*

Forty-six elm trees were treated the first year and forty-six were treated during the next year by the method of either Example 1, 2 or 4, depending on the size of the tree and whether it had ostensible signs of Dutch Elm Disease. Sventy-four of these elms did show typical stigmata of Dutch Elm Disease and eighteen appeared healthy when treated. Of the trees treated the first year, three are now dead one and one-half years later. Two of the dead trees were from the healthy group and one from the diseased group. Of the trees treated the second year, only one is now dead.

In a one and one-half year period with a similar group of trees on neighboring farms, two-thirds showed signs of the disease and over one-half of these are now dead.

The invention claimed is:

1. A method of treating elm trees infected with Dutch Elm Disease which comprises first injecting into the xylem tubes of said tree an aqueous suspension containing elemental sulfur, tartaric acid and iodine and then later after this suspension has been absorbed, injecting into the xylem tubes of said tree a second aqueous suspension containing elemental sulfur, a member of the group consisting of tartaric acid and cream of tartar, a source of magnesium ions and a water-soluble boron compound.

2. A method of treating elm trees infected with Dutch Elm Disease which comprises first injecting into the xylem tubes of said tree an aqueous suspension containing sulfur, tartaric acid and iodine and then later after this suspension has been absorbed, injecting into the xylem tubes of said tree a second aqueous suspension containing sulfur, tartaric acid, a source of magnesium ions and a water-soluble boron compound.

3. A method of treating elm trees infected with Dutch Elm Disease which comprises first injecting into the xylem tubes of said tree an aqueous suspension containing sulfur, tartaric acid and iodine and then later after this suspension has been absorbed, injecting into the xylem tubes of said tree a second aqueous suspension containing sulfur, cream of tartar, a source of magnesium ions and a water-soluble boron compound.

4. The step in the process of treating elm trees infected with Dutch Elm Disease which comprises injecting into the xylem tubes of said tree an aqueous suspension containing elemental sulfur, iodine, and tartaric acid.

5. The process of protecting an elm tree against Dutch Elm Disease which comprises injecting into the xylem tubes of said tree an aqueous suspension containing elemental sulfur, a member of the group consisting of tartaric acid and cream of tartar, a water soluble boron compound, a source of magnesium ions and a high level water-soluble fertilizer.

6. The process of protecting an elm tree against Dutch

Elm Disease which comprises injecting into the xylem tubes of said tree an aqueous suspension containing elemental sulfur, tartaric acid, a water soluble boron compound, a source of magnesium ions and a high level water-soluble fertilizer.

7. The process of protecting an elm tree against Dutch Elm Disease which comprises injecting into the xylem tubes of said tree an aqueous suspension containing elemental sulfur, cream of tartar, a water soluble boron compound, a source of magnesium ions and a high level water-soluble fertilizer.

References Cited in the file of this patent

UNITED STATES PATENTS

| | | |
|---|---|---|
| 83,615 | Flower | Nov. 3, 1868 |
| 709,783 | Lester | Sept. 23, 1902 |
| 2,534,787 | Mecca | Dec. 19, 1950 |
| 2,712,702 | Hosler | July 5, 1955 |
| 2,742,736 | McKay | Apr. 24, 1956 |
| 2,801,200 | Hackmann | July 30, 1957 |

FOREIGN PATENTS

| | | |
|---|---|---|
| 971,436 | France | July 19, 1950 |